March 18, 1941.  A. TANGEN  2,235,179
GEARING
Filed April 20, 1938
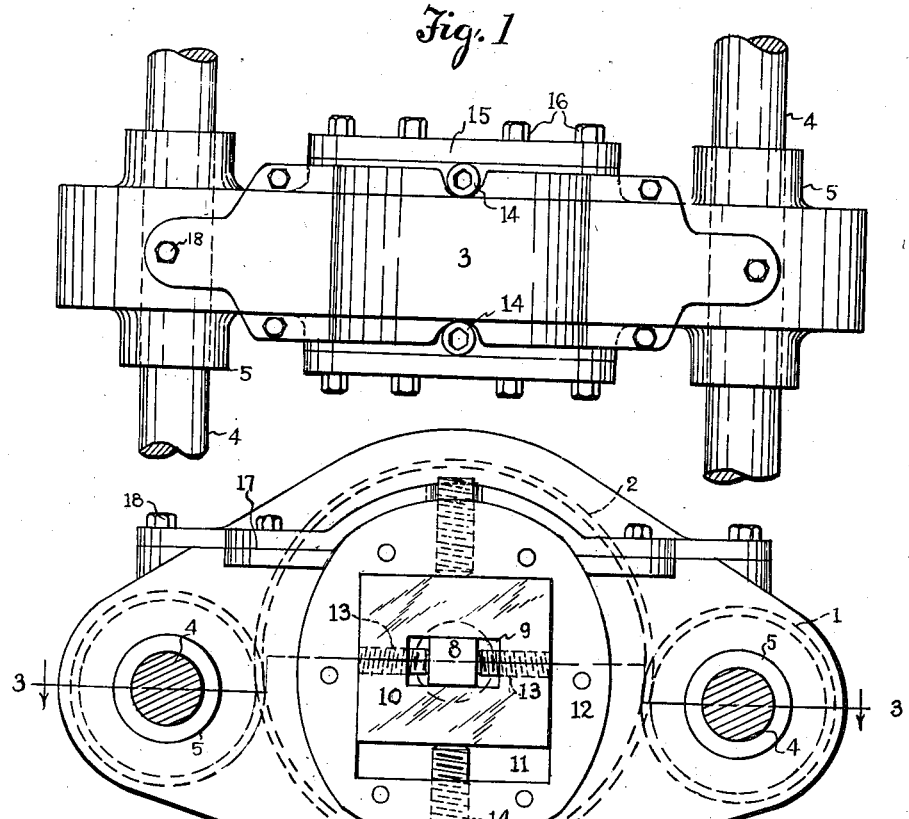
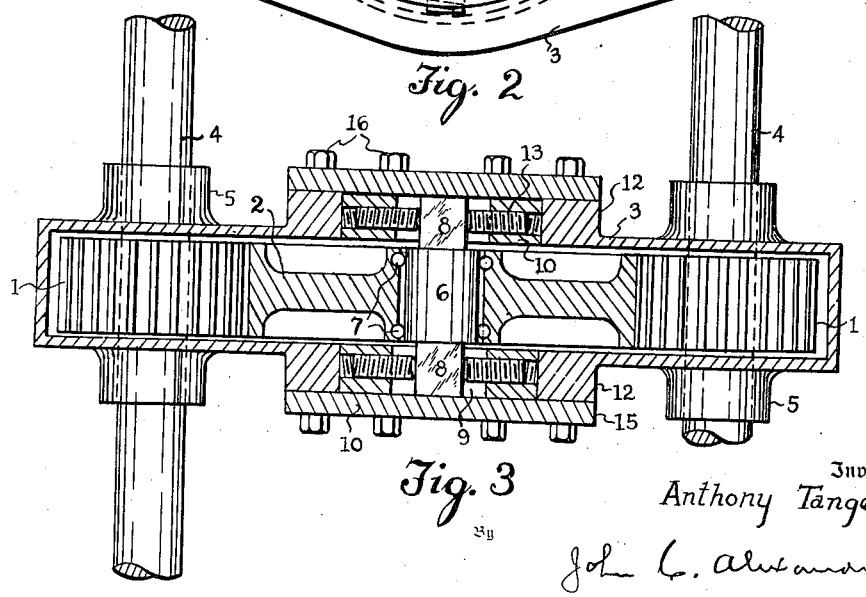
Inventor
Anthony Tangen
By John C. Alexander
Attorney Patented Mar. 18, 1941

2,235,179

UNITED STATES PATENT OFFICE 2,235,179

GEARING

Anthony Tangen, Detroit, Mich.

Application April 20, 1938, Serial No. 203,040

7 Claims. (Cl. 74—397)

This invention relates to gearings and particularly to adjustment mechanisms for taking up gear tooth wear.

An object of the invention is to provide a mounting for enmeshed gears, affording a highly simplified sliding adjustment of one of such gears to take up tooth wear.

Another object is to provide for taking up the tooth wear of a driving and a driven gear by interposing an idler gear between the first-mentioned gears, with its axis initially predeterminedly spaced from the common axial plane of the driving and driven gears, and adapting the idler gear to be adjusted to approach its axis toward said plane.

A further object is to provide for two relatively transverse adjustments of said idler gear, one for equidistantly spacing its axis from those of the driving and driven gears, and the other for taking up the wear of the gear teeth.

A further object is to adapt the described gears to be so assembled that the idler gear will initially locate its own axis equidistantly from those of the driving and driven gears, and to provide for them maintaining such relation.

These and various other objects are attained by the construction hereinafter described and illustrated in the accompanying drawing, wherein:

Fig. 1 is a top view of a housing for a train of gears having my improved provision for taking up wear.

Fig. 2 is a side view of said housing, with the cover removed from the illustrated side.

Fig. 3 is a sectional view of the housed gears, taken on the line 3—3 of Fig. 2.

In these views, the reference character 1 designates two gears, either serving to drive the other through an idler gear 2. The gears 1 are arranged in the end portions of a housing 3, being fixed upon parallel shafts 4 journaled in bearings 5 exteriorly formed on said housing. The gear 2 is journaled on a short shaft 6, and is preferably equipped with two sets of anti-friction bearings 7, mounting it on such shaft. Said shaft has squared ends 8 fitted in slots 9 centrally formed in rectangular blocks 10, which are in turn fitted within rectangular openings 11 formed in enlargements 12, oppositely formed on the sides of the housing 3. The shaft 6 is rendered adjustable to establish it in an equidistant relation to the shafts 4, by elongating the slots 9 in parallelism with the plane determined by the axis of the shafts 4, and by mounting a pair of aligned adjusting screws 13 in each block 10 to project through the end walls of the corresponding slot and oppositely engaging the corresponding squared end 8. For taking up wear, the blocks 10 are adjustable transversely to the plane determined by the axis of the shafts 4, the openings 11 being slightly elongated to afford such adjustment. To hold the blocks 10 selectively adjusted a pair of aligned adjusting screws 14 are mounted in each enlargement 12, their inner ends projecting for engagement by a suitable wrench or other tool. Preferably a cover plate 15 is normally mounted on each enlargement 12, being secured thereto by cap screws 16 or the like, said plates holding the blocks 10 in place, preventing any escape of lubricant, and preventing access of dust or dirt to the housing.

To facilitate assembly of the described gearing, it is preferred to afford removal of the top portion of the housing 3, said portion seating on the main body of the housing, as indicated at 17 in Fig. 2, and being normally held in place by cap screws 18.

In assembling the described gearing, the gears 1 are first inserted in place and the shafts 4 are slid into engagement with said gears and the bearings 5. The gear 2 is then lowered into the housing until it rests jointly on the gears 1. In thus coming to rest on the gears 1, while engaged between the same, the gear 2 will center itself midway between the gears 1. The shaft 6 is then slid into bearings 7 through openings 11. The blocks 10 are now laterally inserted into the openings 11, the screws 13 being first adjusted to properly engage the squared ends of the shaft in its position already established by the gear 2. The lower-most screws 14 are now upwardly adjusted until proper clearance is secured between the teeth of the enmeshed gears. The top portion of the housing is then secured in place, and either before or after fastening the cover plates 15 to the housing, the upper screws 14 are tightened to clamp the blocks 10 firmly in position.

From time to time, as wear occurs at the teeth of the described gears, the blocks 10 are lowered by adjusting the screws 14 until any play resulting from such wear is taken up. When successive adjustments finally shift the axis of the shaft 6 into the axial plane of the shafts 4, no further adjustment is possible. Under such conditions, however, the gear teeth will be worn away to such extent that further use of the gears would be undesirable.

The described compensation for gear tooth wear is simple and inexpensive and permits an accurate adjustment to be quite rapidly made.

The invention is presented as including all such modifications and changes as come within the scope of the following claims.

What I claim is:

1. A gearing comprising a driving and driven gear and an idler gear transmitting the drive and disposed between the driving and driven gears with its axis spaced from the axial plane of the driving and driven gears, a housing enclosing said gears and means carried by the housing and accessible from the housing exterior for adjusting the idler gear towards said plane to compensate for gear tooth wear and for holding it selectively adjusted.

2. A gearing comprising a driving and a driven gear and an idler gear transmitting the drive, means for definitely adjusting the idler gear relative to the driving and driven gears and parallel to the axial plane of the driving and driven gears to locate the axis of the idler gear equidistantly from the axis of the driving and driven gears, and means for definitely adjusting the idler gear toward said plane to compensate for wear of the gear teeth.

3. A gearing comprising a driving and a driven gear and an idler gear transmitting the drive and disposed between the driving and driven gears, with its axis spaced from the axial plane of the driving and driven gears, a shaft mounting the idler gear, a pair of blocks supporting the ends of such shaft and affording it an adjustment substantially parallel to said axial plane, means carried by said blocks for holding the shaft in selective positions of said adjustment, and means for shifting the blocks to adjust said shaft toward said plane to compensate for wear of the gear teeth.

4. A gearing as set forth in claim 3, the idler gear being journaled on said shaft and the ends of the shaft having plane faces for engagement by said adjusting means.

5. A gearing as set forth in claim 3, said blocks being slotted in substantial parallelism with said plane to accommodate the ends of the shaft, and a pair of adjusting screws carried by each block and projecting oppositely into the ends of the slot of such block to hold the shaft selectively positioned in such slot.

6. In a gearing as set forth in claim 3, a housing receiving said gearing, having openings in which said blocks are slidable to and from said plane, and a pair of adjusting screws oppositely engaging each block and carried by the housing for holding the block selectively adjusted in said opening.

7. A gearing comprising a driving and a driven gear and an idler gear transmitting the drive and disposed between the driving and driven gears, with its axis spaced from the axial plane of the driving and driven gears, a support for the idler gear affording such gear an adjustment substantially parallel to said axial plane, means carried by such support for holding the support in selective positions of said adjustment, and means for shifting the support to adjust the idler gear toward said plane to compensate for wear of the gear teeth.

ANTHONY TANGEN.